(12) United States Patent
Higashida et al.

(10) Patent No.: US 12,073,598 B2
(45) Date of Patent: Aug. 27, 2024

(54) MARKET SYSTEM

(71) Applicant: FUJI CORPORATION, Chiryu (JP)

(72) Inventors: Akihiro Higashida, Chiryu (JP); Seigo Kodama, Yatomi (JP); Masatoshi Fujita, Anjo (JP)

(73) Assignee: FUJI CORPORATION, Chiryu (JP)

( * ) Notice: Subject to any disclaimer, the term of this patent is extended or adjusted under 35 U.S.C. 154(b) by 390 days.

(21) Appl. No.: 17/634,221

(22) PCT Filed: Aug. 23, 2019

(86) PCT No.: PCT/JP2019/033088
§ 371 (c)(1),
(2) Date: Feb. 9, 2022

(87) PCT Pub. No.: WO2021/038634
PCT Pub. Date: Mar. 4, 2021

(65) Prior Publication Data
US 2022/0277539 A1    Sep. 1, 2022

(51) Int. Cl.
*G06V 10/20* (2022.01)
*G06F 16/55* (2019.01)
*G06T 7/00* (2017.01)
*G06T 7/50* (2017.01)

(52) U.S. Cl.
CPC .......... *G06V 10/255* (2022.01); *G06F 16/55* (2019.01); *G06T 7/0004* (2013.01); *G06T 7/50* (2017.01); *G06T 2207/30164* (2013.01)

(58) Field of Classification Search
CPC ..... G06V 10/255; G06F 16/55; G06T 7/0004; G06T 7/50; G06T 2207/30164
See application file for complete search history.

(56) References Cited

U.S. PATENT DOCUMENTS

2023/0102048 A1\* 3/2023 Cella ................. B25J 9/1661
700/248

FOREIGN PATENT DOCUMENTS

JP        2002-359500 A    12/2002

OTHER PUBLICATIONS

International Search Report mailed on Nov. 26, 2019 in PCT/JP2019/033088 filed on Aug. 23, 2019, 1 page.

\* cited by examiner

*Primary Examiner* — Diane D Mizrahi
(74) *Attorney, Agent, or Firm* — Oblon, McClelland, Maier & Neustadt, L.L.P.

(57) ABSTRACT

A market system capable of providing, via a network, data necessary for a production facility performing production through image processing for a workpiece imaged by an imaging system, includes a storage section configured to store multiple pieces of shape data that are created from a captured image of the workpiece for respective imaging systems and are used as a reference for a shape of the workpiece in the image processing, in correlation with a type of the imaging system and a type of the workpiece, and a providing section configured to provide data stored in the storage section to a customer of the production facility via the network.

4 Claims, 8 Drawing Sheets

MARKET SYSTEM

TECHNICAL FIELD

The present specification discloses a market system.

BACKGROUND ART

In the conventional art, a system capable of providing service information to a company that is a delivery destination of a production facility such as a component mounter from a supplier of the production facility has been proposed (refer to Patent Literature 1, for example). In this system, a supplier stores recognition data that is image data of a component at a normal posture, dimension data of a component, mounting condition data, and the like in a library, so that each company can search the library to acquire necessary information.

PATENT LITERATURE

Patent Literature 1: JP-A-2002-359500

BRIEF SUMMARY

Technical Problem

The above recognition data is used, when a workpiece such as a component is held by a production facility, to determine the presence or absence of a deviation in a holding position, the good or bad of a posture, or the like from a captured image of the workpiece. However, there may be a slight difference in a shape such as a contour of a workpiece captured in an image due to a difference in a specifications or disposition of an imaging system such as a camera or a lighting included in the production facility. Thus, in order to appropriately perform image processing, it is desirable to create recognition data from an image obtained by actually imaging a workpiece with the imaging system of the production facility. However, in a case where creation of the recognition data is performed at each of delivery destinations of the production facility, since it takes time to create the recognition data, a creation burden is increased.

A principal object of the present disclosure is to appropriately perform image processing while reducing a burden of creating data necessary for image processing.

Solution to Problem

The present disclosure employs the following means in order to achieve the above principal object.

According to the present disclosure, there is provided a market system capable of providing, via a network, data necessary for a production facility performing production through image processing for a workpiece imaged by an imaging system, the market system including a storage section configured to store multiple pieces of shape data that are created from a captured image of the workpiece for respective imaging systems and are used as a reference for a shape of the workpiece in the image processing, in correlation with a type of the imaging system and a type of the workpiece; and a providing section configured to provide data stored in the storage section to a customer of the production facility via the network.

In the market system of the present disclosure, multiple pieces of shape data that are created from a captured image of the workpiece for respective imaging systems and are used as a reference for a shape of the workpiece in the image processing are stored in correlation with a type of the imaging system and a type of the workpiece. The stored data is provided to the customer of the production facility via the network. As a result, since the customer does not have to create the shape data, it is possible to reduce a time period for preparing the shape data. Since the shape data is created from the captured image of the workpiece for each imaging system, it is possible to appropriately perform image processing according to the imaging system of the production facility of the customer. Accordingly, it is possible to appropriately perform the image processing while reducing a burden of creating data necessary for the image processing.

BRIEF DESCRIPTION OF DRAWINGS

FIG. 10 is an explanatory diagram illustrating an example of selection input screen 59a.

DESCRIPTION OF EMBODIMENTS

Next, embodiments of the present disclosure will be described with reference to the drawings.

Figure 1:
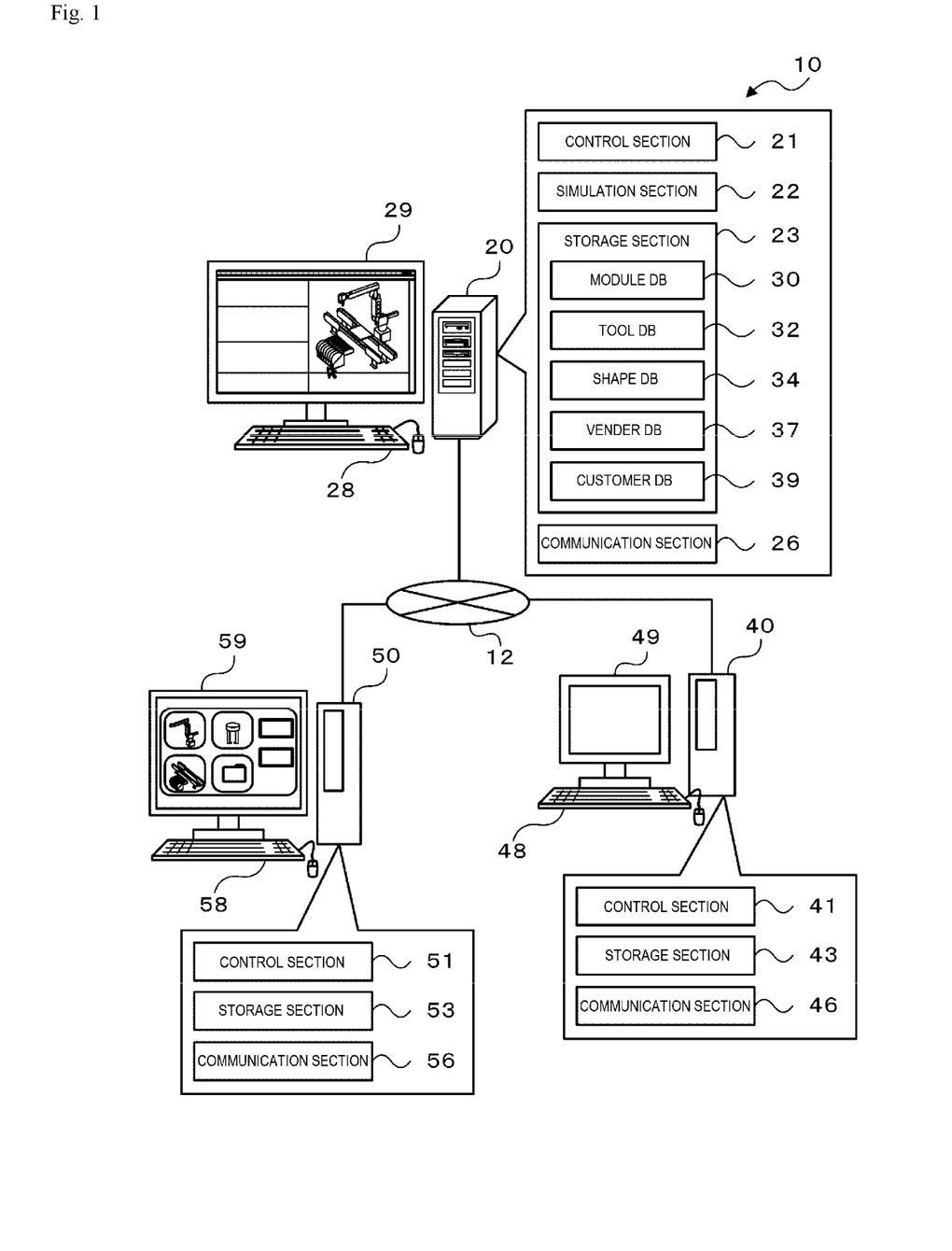
FIG. 1 is a configuration diagram schematically illustrating a configuration of facility introduction support system 10.
Figure 2:
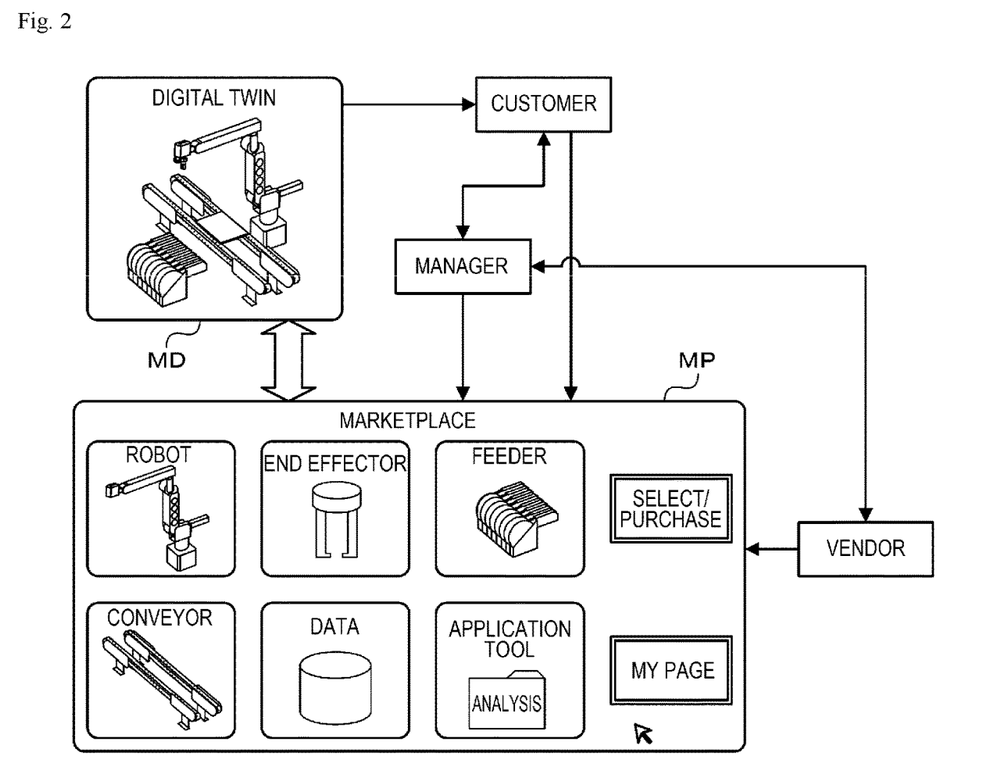
FIG. 2 is an explanatory diagram schematically illustrating marketplace MP.
Figure 3:
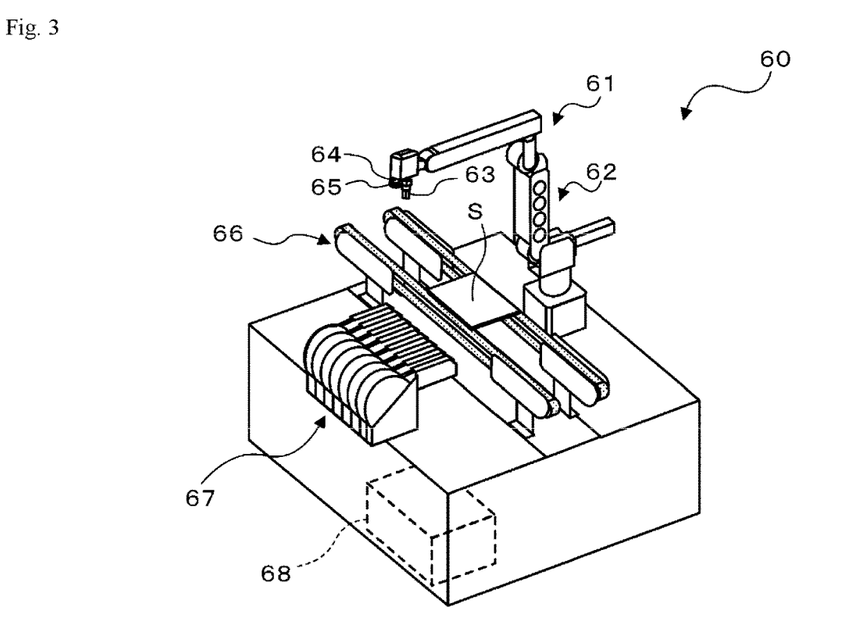
FIG. 3 is a configuration diagram schematically illustrating a configuration of work system 60.

FIG. 1 is a configuration diagram schematically illustrating a configuration of facility introduction support system 10 according to the present embodiment, FIG. 2 is an explanatory diagram schematically illustrating marketplace MP, and FIG. 3 is a configuration diagram schematically illustrating a configuration of work system 60. As illustrated in FIG. 1 and FIG. 2, facility introduction support system 10 includes management server 20 that manages marketplace MP for a customer (user) to purchase various facilities or apparatuses (hereinafter, modules) provided by a vendor. In facility introduction support system 10, management server 20 is connected to vendor terminal 40 and customer terminal 50 via network 12. Although one vendor terminal 40 and one customer terminal 50 are illustrated in FIG. 1, actually, multiple vendor terminals 40 and multiple customer terminals 50 are connected.

Management server 20 includes control section 21, simulation section 22, storage section 23, and communication section 26. Control section 21 includes a CPU, a ROM, a RAM, and the like, and controls the entire server, such as management of marketplace MP. Simulation section 22 builds model MD (digital twin; refer to FIG. 2) such as work system 60 (refer to FIG. 3) in which modules that can be purchased at marketplace MP are combined on a virtual space, and executes simulation using model MD on the virtual space. Storage section 23 is configured with an HDD or the like, and stores various application programs, various pieces of databases (DBs), or the like. Communication section 26 is connected to network 12 or the like, and communicates with vendor terminal 40, customer terminal 50, or the like. Various instructions or the like by a manager are input to management server 20 from input section 28 such as a keyboard and a mouse. Management server 20 displays various pieces of information on display section 29 such as a display. Management server 20 is not limited to including simulation section 22 and storage section 23 (various DBs), and a simulation section may be configured as a separate device capable of communicating with management server 20, or a data server storing various DBs may be configured as a separate device capable of communicating with management server 20.

Vendor terminal 40 includes control section 41 having a CPU, a ROM, a RAM, and the like, storage section 43 such as an HDD storing various application programs or various pieces of data, and communication section 46 connected to network 12 or the like to communicate with management server 20 or the like. Various instructions or the like by a vendor are input to vendor terminal 40 from input section 48 such as a keyboard and a mouse. Vendor terminal 40 displays various pieces of information such as a registration screen for registering various pieces of data such as module data of a module that is a provision target in marketplace MP on display section 49 such as a display.

Similar to vendor terminal 40, customer terminal 50 includes control section 51, storage section 53, and communication section 56. Communication section 56 may communicate with control device 68 of work system 60 that will be described later via network 12 or the like. Various instructions or the like by a customer are input to customer terminal 50 from input section 58 such as a keyboard and a mouse. Customer terminal 50 displays various pieces of information such as a top screen (purchase screen) of marketplace MP, simulation model MD, and a simulation execution result on display section 59 such as a display.

Here, an example of work system (production facility) 60 in which modules that can be purchased at marketplace MP are combined will be described. For example, work system 60 may be configured as a system that performs a predetermined operation by using robot 61, and in the example illustrated in FIG. 3, includes, in addition to robot 61, board conveyance device 66 and feeder 67. For example, examples of the predetermined operation include mounting work in which a workpiece such as a mechanical component or an electronic component is picked up by robot 61 and mounted on board S. Robot 61 includes vertical articulated robot arm 62 and control device 68 that controls the entire system including an operation of robot arm 62. In addition to end effector 63 serving as a work tool being detachably attached to a distal link of robot arm 62, camera 64 that captures an image and lighting 65 such as a ring light disposed coaxially with camera 64 are attached to the distal link. Examples of end effector 63 include an electromagnetic chuck, a mechanical chuck, a suction nozzle, or the like. Board conveyance device 66 conveys board S with a pair of belt conveyors. Feeder 67 is configured as a tape feeder that feeds a tape in which multiple workpieces are accommodated at predetermined intervals. Feeder 67 is not limited to a tape feeder, and may be a tray feeder or the like that supplies a tray on which multiple workpieces are disposed. Control device 68 is configured with a CPU, a ROM, an HDD, a RAM, and the like, and stores a system program or the like for managing entire work system 60 in addition to an operation program for robot 61. Control device 68 receives an image of a workpiece captured by camera 64 during a predetermined operation, performs image processing on the image, recognizes a position or a size of the workpiece, checks whether the workpiece is correct, and selects a workpiece to be picked up. In a case where a workpiece is picked up by a chuck such as an electromagnetic chuck or a mechanical chuck, for example, control device 68 determines, from the image, the presence or absence of interference with other workpieces around a target workpiece, and selects a workpiece without interference as a pickup target. Although not illustrated, an operation program for board conveyance device 66 is stored in a programmable logic controller (PLC) of board conveyance device 66, and an operation program for feeder 67 is stored in a PLC of feeder 67. Each of robot 61 (robot arm 62), end effector 63, camera 64, lighting 65, board conveyance device 66, and feeder 67 configuring work system 60 will be referred to as a module.

Storage section 23 of management server 20 stores module DB (database) 30, tool DB 32, shape DB 34, vendor DB 37, and customer DB 39. Although not illustrated, vendor DB 37 registers a name of a vendor for which authentication registration has been performed, a vendor ID unique to each vendor, contact information such as an address or an e-mail address, information regarding the type of module provided by a vendor, and the like. Although not illustrated, customer DB 39 registers a name of a customer for whom authentication registration has been performed, a customer ID unique to each customer, contact information such as an address and an e-mail address, a purchase history of a customer, and the like.

Figure 4:
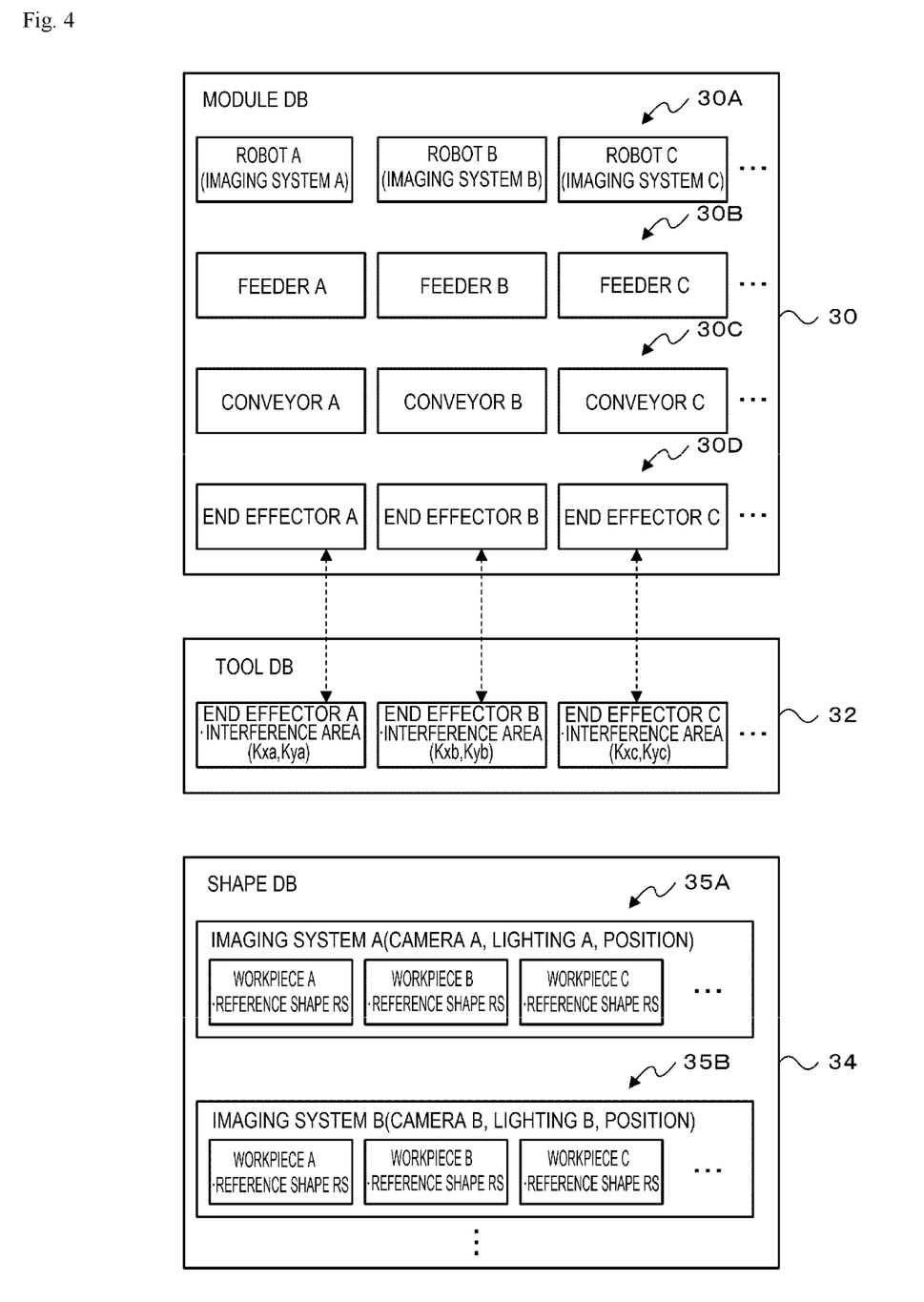
FIG. 4 is an explanatory diagram illustrating an example of module DB 30, tool DB 32, and shape DB 34.

Here, FIG. 4 is an explanatory diagram illustrating examples of module DB 30, tool DB 32, and shape DB 34. Module DB 30 registers module data or the like registered by a vendor from vendor terminal 40 via a registration screen. In module DB 30, multiple module data are registered to be classified by the type of module, such as robot data 30A, feeder data 30B, conveyor data 30C, and end effector data 30D. Although not illustrated, camera data or lighting data is also registered. Each piece of module data includes shape data such as three-dimensional CAD data of each module, an operation program for a module in a case where the module is operable, information regarding an imaging system such as a specification of a camera or a specification of a lighting including the type of lens in a case where the imaging system such as a camera or a lighting is provided, information regarding a connector required for various connections, specifications, and the like. In FIG. 4, for example, information regarding imaging system A attached to robot A in a standard manner is included in module data of robot A. Similarly, information regarding imaging system B is included in module data of robot B, and information regarding imaging system C is included in module data of robot C. Although not illustrated, module data including shape data, physical property data, or the like of a representative workpiece that is a work target are also registered in module DB 30. Module data of the workpiece may be registered by a vendor, or a manager in response to a request from a customer, and is used in simulation using model MD.

Figure 5A:
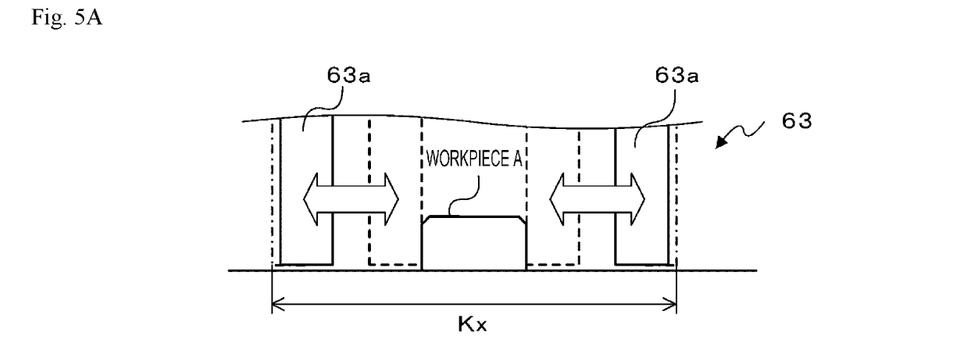
FIGS. 5A and 5B are explanatory diagrams illustrating an example of an interference area (Kx, Ky).
Figure 5B:
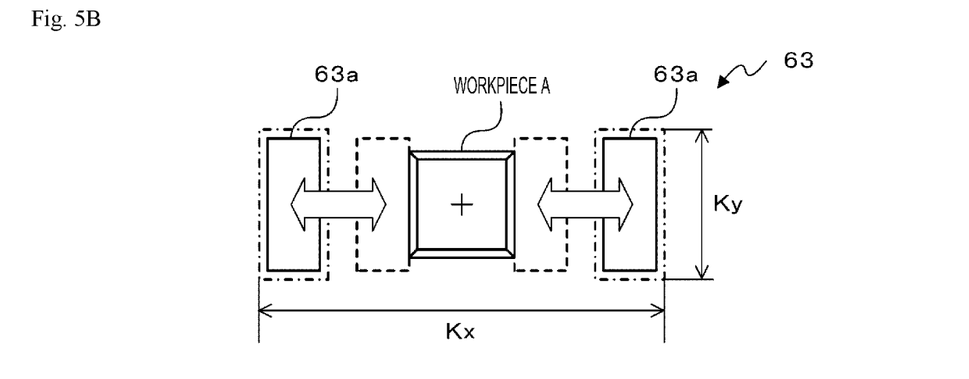

Tool DB 32 registers tool data indicating an interference area for determining whether there is interference with other workpieces or the like in the periphery when end effector 63 such as an electromagnetic chuck or a mechanical chuck chucks a workpiece. FIGS. 5A and 5B are an explanatory diagram illustrating an example of an interference area (Kx, Ky). FIGS. 5A and 5B illustrate an example in which end effector 63 includes a pair of chuck claws 63a capable of opening and closing operation. FIG. 5A illustrates a state in which chuck claws 63a grip workpiece A when viewed from the side, and FIG. 5B illustrates a state in which chuck claws 63a grip workpiece A when viewed from the top. As illustrated, the pair of chuck claws 63a are changed into an opened state (refer to solid lines) and a closed state (refer to dashed lines) through opening and closing operations to grip a workpiece in the closed state. The interference area is an area in which chuck claws 63a in the opened state do not interfere with the periphery, and is determined by, for example, value Kx of the opening/closing direction of chuck claws 63a and value Ky in a predetermined direction orthogonal to the opening/closing direction in a horizontal plane. Value Kx is a value obtained by adding, to outer dimensions of both chuck claws 63a in the opened state based on an opening/closing stroke amount of chuck claws 63a and a width (thickness) of chuck claws 63a in the opening/closing direction, a margin of about several mm in consideration of individual differences in dimensions of chuck claws 63a, the positional accuracy of end effector 63 when the robot grips a workpiece, and the like. Value Ky is a value obtained by adding a margin of about several mm to a width of chuck claws 63a in a predetermined direction in the same manner as described above. Each piece of tool data is determined for each type of end effector 63, and is registered in tool DB 32 in correlation with the type of end effector 63. For example, an interference area (Kxa, Kya) is registered in correlation with end effector A, an interference area (Kxb, Kyb) is registered in correlation with end effector B, and an interference area (Kxc, Kyc) is registered in correlation with end effector C. The interference area (Kx, Ky) in the tool data is not limited to an area in which only values are registered, and an area indicated by a frame in an image may be registered.

Figure 6:
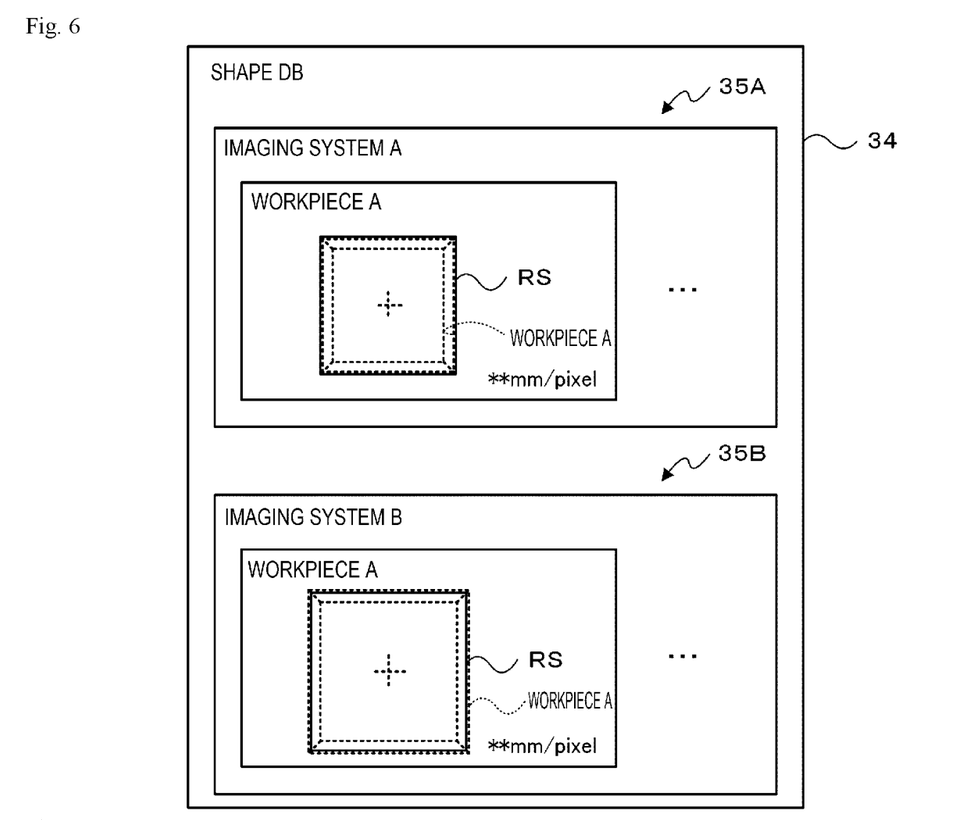
FIG. 6 is an explanatory diagram illustrating an example of reference shape RS.

Shape DB 34 registers shape data serving as a reference for a shape of a workpiece when image processing of the workpiece is performed by control device 68 or the like of work system 60. In the present embodiment, reference shape RS that is a reference of a shape of a workpiece in image processing is set from an image obtained by each imaging system capturing a workpiece, and is registered in shape DB 34 as shape data. Thus, multiple pieces of shape data of each workpiece imaged by imaging system A are registered as data 35A for imaging system A, and multiple pieces of shape data of each workpiece imaged by imaging system B are registered as data 35B for imaging system B. FIG. 6 is an explanatory diagram illustrating an example of reference shape RS. As illustrated, reference shape RS of workpiece A of imaging system A is data with a contour line slightly outside an original workpiece shape indicated by dashed lines as a reference. On the other hand, reference shape RS of workpiece A of imaging system B is data with a contour line slightly inside the original workpiece shape indicated by dashed lines as a reference. Here, for example, when an imaging system differs due to a difference in a specification of camera 64 including a lens, a specification of lighting 65, a disposition position of camera 64 or lighting 65, even if an image of the same workpiece is captured, an imaging state of the workpiece in the image changes, and thus a difference may occur in a size or a shape of the workpiece in the image. In the present embodiment, as described later, in order to appropriately suppress the influence of such a difference on image processing, shape data indicating reference shape RS of a workpiece is registered in shape DB 34 for each imaging system. A pixel resolution (mm/pixel) of the imaging system is also registered in each piece of shape data.

On the top screen of marketplace MP displayed on customer terminal 50 or the like, it is possible to request purchase of or view these modules, request provision of various pieces of data, request purchase of or view various application tools, log in to the customer's my page, and the like. As illustrated in FIG. 2, on the top screen, for example, icons or data request icons for respective types of modules indicating modules such as the robot, the end effector, the feeder, and the conveyor, icons for selecting application tools, a purchase button, a login button to the my page, and the like are displayed. When a customer selects an icon of a desired module after operating (clicking) the purchase button through an operation input using input section 58, a module selection screen (not illustrated) for displaying a list of relevant types of module data in a selectable manner is displayed. For example, when the customer selects an icon of the robot, module data 31 of each robot is displayed in a list form, and the customer can select and purchase a necessary module from the list. Module data displayed in a list form is registered in module DB 30. When the customer selects an icon of the application tool after operating the purchase button, an application tool selection screen (not illustrated) that displays a list of various application tools in a selectable manner is displayed. The customer can select and purchase a necessary application tool from the list. Examples of the various application tools include an analysis tool that collects and analyzes information such as a work status or the frequency of abnormality occurrence of each module, a proposal tool that proposes an improvement plan such as changing a module based on an analysis result, and a layout tool that efficiently lays out a module. The customer can select an icon of a module or an icon of an application tool without clicking the purchase button to view the contents of the module or the application tool displayed in a list form. When the customer logs in to the my page, it is possible to confirm a module purchase history, a content and a change history of a module scheduled to be introduced, contact matters from management server 20 or a vendor, or the like.

Next, processes of facility introduction support system 10 configured as described above, particularly processes related to tool data and shape data will be described. First, a process of registering tool data and shape data in tool DB 32 and shape DB 34 will be described.

Figure 7:
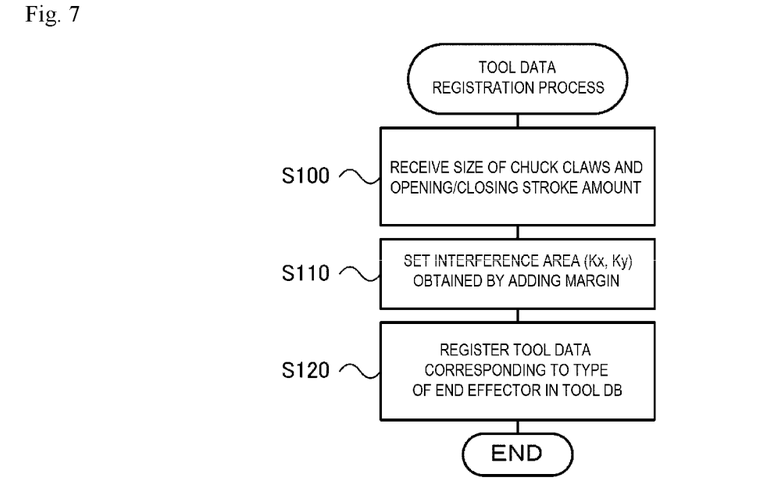
FIG. 7 is a flowchart illustrating an example of a tool data registration process.

FIG. 7 is a flowchart illustrating an example of a tool data registration process. This process is executed by control section 21, for example, in a case where tool data is registered by a vendor. In the tool data registration process, first, control section 21 receives the size and the opening/closing stroke amount of chuck claws 63a via a registration screen (not illustrated) displayed on display section 49 of vendor terminal 40 (S100). Control section 21 is not limited to receiving information from vendor terminal 40, and may acquire necessary information from specification information registered in end effector data 30D of module DB 30.

Next, control section 21 obtains value Kx obtained by adding a margin to the outer dimensions of both chuck claws 63a in the opened state based on the opening/closing stroke amount of chuck claws 63a and the width (thickness) of chuck claws 63a in the opening/closing direction, and value Ky obtained by adding a margin to the width of chuck claws 63a in the predetermined direction, and sets the interference area (Kx, Ky) (S110). Control section 21 may obtain value Kx by receiving information regarding the outer dimensions of both chuck claws 63a in the opened state. Control section 21 registers the interference area (Kx, Ky) set in S110 in tool DB 32 as tool data corresponding to the type of end effector 63 (S120), and finishes the tool data registration process.

Figure 8:
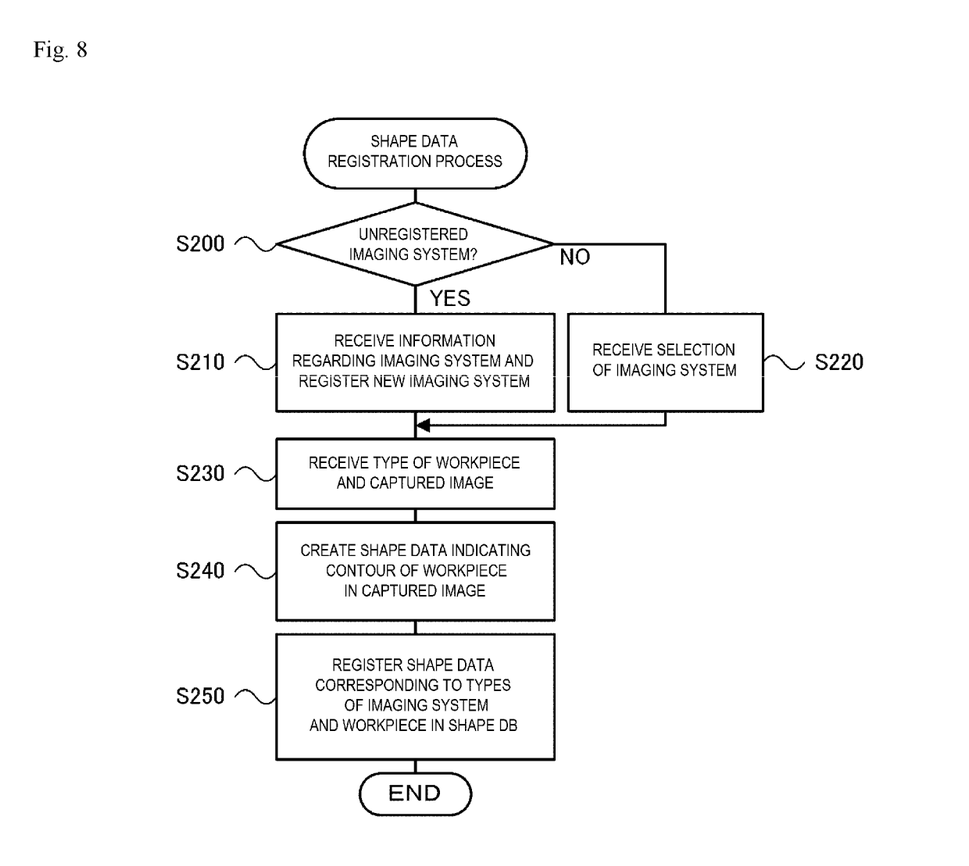
FIG. 8 is a flowchart illustrating an example of a shape data registration process.

FIG. 8 is a flowchart illustrating an example of a shape data registration process. This process is executed by control section 21 in a case where shape data is registered by a vendor, or is executed by control section 21 in a case where the shape data is registered by a customer. The shape data registration process is performed via a registration screen (not illustrated) displayed on display section 49 of vendor terminal 40 or display section 59 of customer terminal 50. In the shape data registration process, first, control section 21 determines whether an imaging system that is a shape data registration target is an unregistered imaging system (S200). When the imaging system is an unregistered imaging system, control section 21 receives information regarding the imaging system, registers the new imaging system in shape DB 34 (S210), and proceeds to S230. For example, control section 21 receives information such as the specification of camera 64, the specification of lighting 65, and the disposition positions of camera 64 and lighting 65, and registers the information together with information indicating the type of the imaging system. When the imaging system is an imaging system that has already been registered, control section 21 receives selection of a registration target imaging system (S220), and proceeds to S230.

Next, control section 21 receives the type of registration target workpiece and an image of the workpiece (S230). In S230, control section 21 receives an image of the workpiece actually imaged by the imaging system of work system 60. Subsequently, control section 21 performs image processing on the received image to create shape data indicating a contour of the workpiece in the image (S240). For example, control section 21 extracts multiple edges of the workpiece in the image, and creates, as shape data, a contour line connecting the extracted respective edges smoothly. Control section 21 registers the shape data corresponding to the imaging system registered in S210 or the imaging system selected in S220 and the type of workpiece in shape DB 34 (S250), and finishes the shape data registration process. For example, when imaging system A is a target, control section 21 registers the shape data of the new workpiece as data 35A for imaging system A of shape DB 34.

Figure 9:
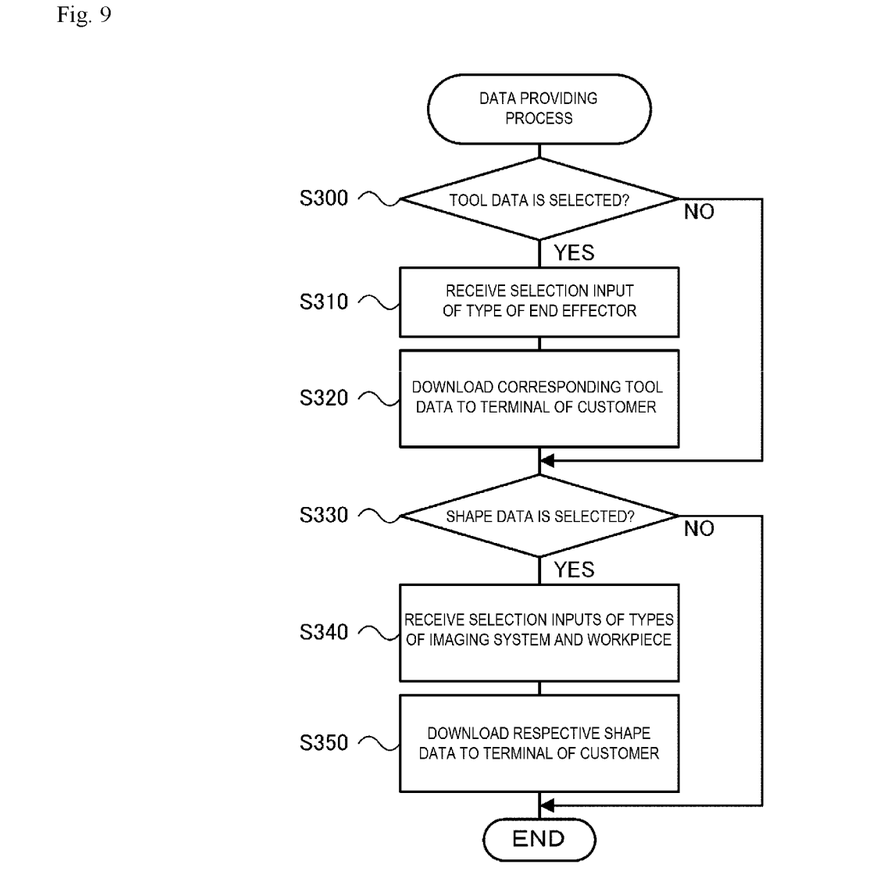
FIG. 9 is a flowchart illustrating an example of a data providing process.

Subsequently, a process of providing each piece of data from tool DB 32 and shape DB 34 to a customer will be described. FIG. 9 is a flowchart illustrating an example of a data providing process. This process is executed by control section 21 in a case where a request for providing various pieces of data is selected from the top screen of marketplace MP displayed on display section 59 of customer terminal 50. In the data providing process, first, control section 21 determines whether tool data has been selected from the customer on a request data selection screen (not illustrated) (S300), and when it is determined that tool data is not selected, proceeds to S330. On the other hand, when it is determined that the tool data is selected in S300, control section 21 receives a selection input of the type of end effector 63 via a tool data selection input screen (not illustrated) (S310), selects tool data corresponding to the received type of end effector 63 from tool DB 32, and downloads the selected tool data to customer terminal 50 (S320). For example, when a selection input of end effector A is received as the type of end effector 63, control section 21 downloads the interference area (Kxa, Kya) that is tool data of end effector A to customer terminal 50. Control section 21 may download the interference area (Kx, Ky) to customer terminal 50 as image data into which the interference area is automatically converted in accordance with a pixel resolution of the imaging system in work system 60 of the customer. As a result, control device 68 of work system 60 of the customer can reflect the downloaded image data in an image to check whether there is interference with the periphery of the workpiece, for example, in image processing when the workpiece is chucked. That is, since control device 68 does not need to create the image data into which the interference area (Kx, Ky) is converted, it is possible to reduce efforts for creating. It is needless to say that control device 68 may convert the downloaded interference area (Kx, Ky) in accordance with the pixel resolution of the imaging system of work system 60.

Figure 10A:
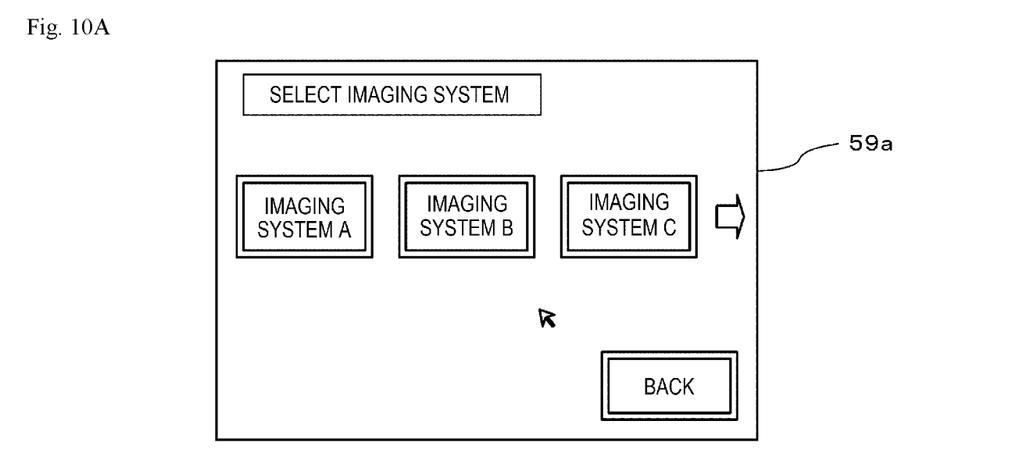
Figure 10B:
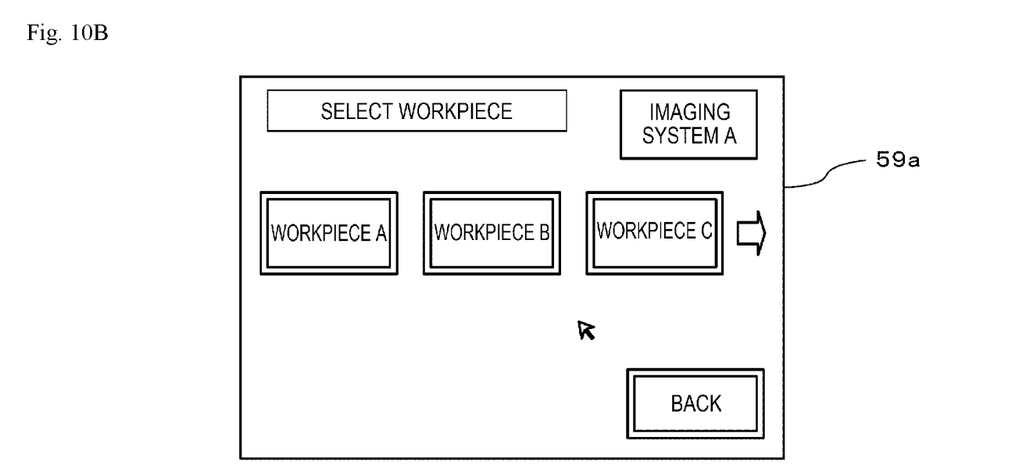

Next, control section 21 determines whether shape data has been selected from the customer on the request data selection screen (S330), and finishes the data providing process when it is determined that the shape data is not selected. On the other hand, when it is determined in step S330 that the shape data is selected, control section 21 displays selection input screen 59a on display section 59, and receives selection inputs of the type of imaging system and the type of workpiece from the customer (S340). FIG. 10 is an explanatory diagram illustrating an example of selection input screen 59a. In selection input screen 59a, first, control section 21 displays button images of multiple imaging systems, and receives a selection input of the type of imaging system from the customer through an operation (clicking) using input section 58 (refer to FIG. 10A). When a selection input of the imaging system is received from the customer, control section 21 displays button images of multiple workpieces registered in the imaging system, and receives a selection input of the type of workpiece through an operation (clicking) using input section 58 (refer to FIG. 10B). FIG. 10B illustrates a screen in a case where a selection input of imaging system A is received in FIG. 10A. When the back button in FIG. 10A is operated, the process returns to the request data selection screen, and when the back button in FIG. 10B is operated, the process returns to FIG. 10A. In the selection input screen for the tool data, button images of multiple end effectors 63 (end effectors A, B, and C) are displayed such that end effectors 63 can be selected and input in the same manner as in FIG. 10.

When the selection inputs of the types of imaging system and workpiece are received as described above, control section 21 selects shape data corresponding to the received types of the imaging system and workpiece from shape DB 34, downloads the selected shape data to customer terminal 50 (S350), and finishes the data providing process. The tool data or the shape data downloaded to customer terminal 50 is transferred to control device 68 of work system 60 and used in image processing of control device 68. In the present embodiment, an example in which the selection of the tool data, the selection of the imaging system, and the selection of the workpiece are performed in this order is described, but this order is only an example, and selection may be performed in a different order. There is a case where shape data desired by a customer is not registered depending on a registration status of shape data. Thus, for example, control section 21 may display a message indicating that an imaging system or a workpiece that has been registered is displayed on selection input screen 59a in FIG. 10B, and a selection input of an imaging system or a workpiece that is not displayed thereon cannot be received. In this case, although a customer needs to create shape data himself or herself, since shape data is registered and used at any time through the shape data registration process described above, it is possible to suppress the frequent occurrence of a case where creation of the shape data is necessary.

Here, as described above, when imaging systems are different, even if images of the same workpiece are captured, there may be a difference in a size or a shape of the workpiece in the images. For example, in the workpiece illustrated in FIG. 6, when not only a size captured in the image differs depending on imaging systems, but also a reflection status of light differs or contrast of an image differs, a boundary between the edges captured in the image may be located outside or inside the original workpiece shape indicated by the dashed lines. Thus, when a common reference shape is applied through image processing for the same type of workpiece imaged by different imaging systems, not only efforts for size conversion occur, but also there would be a case where a failure such as a recognition error or a confirmation error occurs. In the present embodiment, even for the same type of workpiece, shape data indicating reference shape RS of a workpiece is registered in shape DB 34 for each imaging system, and thus a customer can download the shape data to customer terminal 50. Therefore, control device 68 can appropriately perform image processing by using shape data (reference shape RS) corresponding to an imaging system of work system 60. In a case where it is not necessary to create shape data corresponding to an introduced imaging system, a customer can reduce the time period for preparing the shape data. In the present embodiment, tool data indicating interference area (Kx, Ky) of chuck claws 63a or the like for each type of end effector 63 is registered in tool DB 32, and thus a customer can download the tool data to customer terminal 50.

Here, correspondence relationships between constituents of the present embodiment and constituents of the present disclosure will be clarified. Facility introduction support system 10 including marketplace MP of the present embodiment corresponds to a market system, storage section 23 of management server 20 corresponds to a storage section, and control section 21 of management server 20 that executes the data providing process corresponds to a providing section. Control section 21 of management server 20 that executes the shape data registration process corresponds to a registration section.

Facility introduction support system 10 described above stores multiple pieces of shape data that are created from a captured image of a workpiece for respective imaging systems and are used as reference shape RS of the workpiece in image processing, in storage section 23 (shape DB 34) in correlation with the type of imaging system and the type of workpiece. The shape data can be provided (downloaded) to customer terminal 50. Therefore, it is possible to reduce a time period during which a customer prepares the shape data and thus to reduce a creation burden. Image processing can be appropriately performed by using the shape data corresponding to an imaging system.

Facility introduction support system 10 stores tool data indicating the interference area (Kx, Ky) of chuck claws 63a in storage section 23 (tool DB 32) in correlation with the type of end effector 63. Therefore, it is possible to omit efforts for a customer to set the tool data and thus to further reduce a burden of creating data necessary for image processing. It is possible to prevent a customer from erroneously setting the tool data. A customer can acquire the shape data or the tool data from marketplace MP. Therefore, a customer can easily acquire data of a module purchased at marketplace MP without searching another website.

Since a customer can request necessary shape data by selecting the types of imaging system and workpiece on selection input screen 59a, data can be easily acquired without inputting information regarding each of the types of imaging system and workpiece.

In the shape data registration process, facility introduction support system 10 receives an image of a workpiece from not only a vendor but also a customer, creates shape data from the image, and registers the shape data in storage section 23 (shape DB 34). Therefore, even in a case where the shape data of a workpiece of a certain imaging system is not registered in shape DB 34, it is possible to register new shape data at any time from an image of the workpiece captured by the imaging system. Thus, the shape data stored in shape DB 34 can be enhanced, and the shape data can also be efficiently used between customers.

Needless to say, the present disclosure is not limited to the embodiment that has been described, and can be carried out in various forms without departing from the technical scope of the present disclosure.

For example, in the above embodiment, shape data can be registered by receiving an image of a workpiece from a customer in the shape data registration process; however, the configuration is not limited to this, and the shape data may be registered by receiving only an image from a vendor.

In the above embodiment, a customer requests necessary shape data by selecting the types of imaging system and workpiece on selection input screen 59a; however, the configuration is not limited to this, and the customer may request necessary shape data by inputting information regarding each of the types of imaging system and workpiece. Alternatively, selection of data that is an output target may be received from a customer and the received data may be provided to the customer via a network, or shape data of a workpiece registered in an imaging system of work system 60 of the customer may be automatically provided to the customer. In such a case, each time shape data of a new workpiece is registered in the shape data registration process, new shape data may be provided to a customer having robot 61 of the same imaging system. Regarding tool data, tool data of end effector 63 may be automatically provided to a customer, for example, when the customer purchases (introduces) end effector 63.

In the above embodiment, storage section 23 includes tool DB 32 and shape DB 34 to store tool data and shape data; however, the configuration is not limited to this, and storage section 23 may include shape DB 34 to store shape data, such as storage section 23 that does not include tool DB 32 and does not store tool data. In such a case, a customer may set an interference area. For example, in a case where a suction nozzle is used as end effector 63, since the suction nozzle is housed in a suction surface of a component, tool data is not required. In a case where an inspection device or the like for board S inspects a mounting state of a component on board S, since it is not necessary to determine interference through image processing, the tool data is not required.

In the above embodiment, shape data is registered for each imaging system attached to robot 61 in a standard manner; however, the configuration is not limited to this. For example, shape data of an imaging system in which camera 64 and lighting 65 that can be attached to robot 61 are combined may be registered. For example, in a case where an imaging system can be freely selected and introduced by a customer, it is possible to reduce a burden of creating data necessary for image processing by selecting an imaging system in which more shape data of a workpiece scheduled to be produced is registered. Therefore, the customer can use the number of registrations of shape data for each imaging system in shape DB 34 as a determination material when introducing an imaging system.

In the above embodiment, work system 60 configured with multiple modules has been exemplified, but the work system is not limited to this, and may be a system configured with one module, such as robot 61 to which camera 64, lighting 65, and the like are attached in a standard manner, as long as the work system performs production through image processing for a workpiece imaged by an imaging system. Alternatively, a system including a module conveying an article such as a conveyor and an imaging system may be used. Camera 64 and lighting 65 attached to the distal link of robot arm 62 of robot 61 have been exemplified as an imaging system; however, the configuration is not limited to this. For example, an imaging system may be attached to a ceiling or the like above robot 61, or may be attached to a gate-type frame disposed to straddle a conveyor of board conveyance device 66.

In the above embodiment, facility introduction support system 10 that not only performs management of marketplace MP but also includes simulation section 22 has been exemplified, but is not limited to this, and may be any system that manages marketplace MP where commodities relating to production facilities can be transacted via a network, without including simulation section 22. Although the modules and the application tools have been exemplified as commodities, the present disclosure is not limited to a system capable of purchasing both, and may be a system capable of purchasing only one of them.

Here, the market system of the present disclosure may be configured as follows. For example, in the market system of the present disclosure, the production facility may include a tool that can be opened and closed to grip the workpiece, and the storage section may store tool data indicating an area for determining whether there is interference with the periphery when the tool grips the workpiece, in correlation with the type of the tool. As a result, since a user of the system can save efforts to set the tool data, it is possible to further reduce a burden of creating data necessary for image processing.

In the market system of the present disclosure, the providing section may receive selection inputs of the type of the imaging system and the type of the workpiece from a customer, and provide the shape data with respect to the selection inputs to the customer. As a result, the customer can easily acquire necessary shape data by selecting the type of the imaging system of a production facility and the type of the workpiece that is a production target.

The market system of the present disclosure may include a registration section that receives an image of the workpiece captured by the imaging system of the production facility from a customer via a network, creates the shape data from the received image, and registers the shape data in the storage section. As a result, since new shape data can be registered, it is possible to efficiently use the shape data between customers.

INDUSTRIAL APPLICABILITY

The present disclosure can be applied to, for example, the technical field of a market system where commodities relating to production facilities can be transacted via a network.

REFERENCE SIGNS LIST

10 Facility introduction support system, 12 Network, 20 Management server, 21, 41, 51 Control section, 22 Simulation section, 23, 43, 53 Storage section, 26, 46, 56 Communication section, 28, 48, 58 Input section, 29, 49, 59 Display section, 30 Module DB, 30A Robot data, 30B Feeder data, 30C Conveyor data, 30D End effector data, 32 Tool DB, 34 Shape DB, 35A Data for imaging system A, 35B Data for imaging system B, 37 Vendor DB, 39 Customer DB, 40 Vendor terminal, 50 Customer terminal, 59a Selection input screen, 60 Work system, 61 Robot, 62 Robot arm, 63 End effector, 63a Chuck claw, 64 Camera, 65 Lighting, 66 Board conveyance device, 67 Feeder, 68 Control device, MD Model, MP Marketplace, RS reference shape, S Board

The invention claimed is:

1. A market system capable of providing, via a network, data necessary for a production facility performing production through image processing for a workpiece imaged by an imaging system, the market system comprising:
   a storage section configured to store multiple pieces of shape data that are created from a captured image of the workpiece for respective imaging systems and are used as a reference for a shape of the workpiece in the image processing, in correlation with a type of the imaging system and a type of the workpiece; and
   a providing section configured to provide data stored in the storage section to a customer of the production facility via the network.

2. The market system according to claim 1, wherein
   the production facility includes a tool that can be opened and closed to grip the workpiece, and
   the storage section stores tool data indicating an area for determining whether there is interference with a periphery when the tool grips the workpiece, in correlation with a type of the tool.

3. The market system according to claim 1, wherein
   the providing section receives selection inputs of the type of the imaging system and the type of the workpiece from the customer, and provides the shape data with respect to the selection inputs to the customer.

4. The market system according to claim 1, further comprising:
   a registration section configured to receive an image of the workpiece captured by the imaging system of the production facility from the customer via the network, create the shape data from the received image, and register the shape data in the storage section.

\* \* \* \* \*